United States Patent
Fischer et al.

(10) Patent No.: US 7,267,527 B2
(45) Date of Patent: Sep. 11, 2007

(54) ROTOR FOR A TURBOMACHINE

(75) Inventors: Martin Fischer, Olching (DE);
Wilfried Weidmann, Erdweg (DE);
Eberhard Knodel, Jetzendorf-Priel (DE)

(73) Assignee: MTU Aero Engines GmbH, Munich (DE)

( * ) Notice: Subject to any disclaimer, the term of this patent is extended or adjusted under 35 U.S.C. 154(b) by 218 days.

(21) Appl. No.: 11/095,556

(22) Filed: Apr. 1, 2005

(65) Prior Publication Data

US 2005/0226730 A1    Oct. 13, 2005

(30) Foreign Application Priority Data

Apr. 2, 2004    (DE) ............... 10 2004 016 244

(51) Int. Cl.
*F01D 5/00* (2006.01)

(52) U.S. Cl. .................................... 415/199.5
(58) Field of Classification Search ............ 415/199.5, 415/115; 416/198 A
See application file for complete search history.

(56) References Cited

U.S. PATENT DOCUMENTS 3,602,605 A * 8/1971 Lee et al. .................... 415/116
6,428,272 B1 * 8/2002 Pepi et al. ................. 416/96 R
6,991,429 B2 * 1/2006 Uematsu et al. .......... 416/96 R

FOREIGN PATENT DOCUMENTS

| DE | 815 545 | 10/1951 |
| DE | 1 870 227 | 4/1963 |
| DE | 21 35 088 | 4/1972 |
| DE | 22 48 929 | 4/1973 |
| DE | 25 42 445 | 4/1977 |
| DE | 196 27 386 A1 | 7/1996 |
| DE | 198 28 817 C2 | 6/1998 |
| JP | 2000-45702 A | 2/2000 |

* cited by examiner

*Primary Examiner*—Ninh H. Nguyen
(74) *Attorney, Agent, or Firm*—Crowell & Moring LLP

(57) ABSTRACT

The invention relates to a rotor for a turbomachine, in particular a low-pressure turbine rotor for a gas turbine, having at least one stage, each stage comprising a rotor disk having rotor blades attached to the rotor disk, and the rotor disk of each stage being removably connected either to oppositely situated rotor disks of adjoining stages or to a rotor connection of a rotor shaft by at least one respective attachments. According to the invention, the, or each of the, attachment means extends through the rotor disk of at least one stage, whereby the, or each of the, attachment means is guided with radial play into at least one borehole passing through the respective rotor disk, so that an interior borehole surface is not subjected to load or force.

8 Claims, 1 Drawing Sheet

ROTOR FOR A TURBOMACHINE

This application claims the priority of German document no. 10 2004 401 6244.1, filed Apr. 2, 2004, the disclosure of which is expressly incorporated by reference herein.

BACKGROUND AND SUMMARY OF THE INVENTION

The invention relates to a rotor for a turbomachine, in particular for a gas turbine, having removably connected rotor disk stages. The invention further relates to a turbomachine, a stationary gas turbine, and an aircraft engine.

Rotors for turbomachines generally have multiple stages, each stage comprising a rotor disk, with multiple rotor blades which rotate together with the rotor being attached to the rotor disk for each stage. The rotor disks of the multiple stages of the rotor may be connected to one another or to the rotor shaft in a number of ways, for example, unremovably connected by welding or removably connected by screws. The present invention relates to rotors, the rotor disks of which are removably connected to one another or to a rotor shaft.

DE 196 27 386 A1 discloses a connection system for two adjoining turbine rotor disks, each of the adjoining rotor disks to be connected to one another having a shell extending in the axial direction, with flanges being situated at the ends of the shells extending in the axial direction. According to DE 196 27 386 A1, an attachment means designed as an extension bolt passes through the oppositely situated flanges for two adjoining rotor disks to be connected to one another, and is removably connected to the flanges via nuts.

DE 198 28 817 C2 discloses a rotor for a turbomachine having at least two bladed stages, the rotor disks of which are removably connected to one another. In the rotor according to DE 198 28 817 C2, only every other rotor disk is provided with a shell which extends essentially in the axial direction and has a flange situated on the end of the particular shell. A rotor disk that is positioned between two such rotor disks and that is to be connected to these rotor disks has flanges in the vicinity of the lateral faces of the respective rotor disk. In DE 198 28 817 C2, an attachment means designed as a screw bolt is used to connect two flanges for rotor disks to be connected to one another.

The rotors according to DE 196 27 386 A1 and DE 198 28 817 C2 share the common feature that the attachment means for connecting two adjoining rotor disks is situated in an installation space between the adjoining rotor disks to be connected to one another. According to the prior art, the attachment means passes through flanges for the adjoining rotor disks to be connected to one another. Since during operation the rotor disks must absorb large forces, for example large centrifugal forces, according to the prior art the attachment means does not extend through the rotor disks as such. Rather, in the prior art, as already mentioned, the attachment means is positioned between two adjoining rotor disks to be connected to one another, and extend only through the flanges.

Future designs for aircraft engines, however, require an increasingly compact design for the engines, and therefore also require an increasingly compact design for the rotors. The axial distance between two adjoining rotor disks to be connected to one another, and thus the installation space for positioning the attachment means, ultimately decreases as well. Consequently, the known designs for connecting adjoining rotor disks are not suitable for increasingly compact designs of aircraft engines.

Based on the foregoing, the object of the present invention is to provide a novel rotor for a turbomachine, in particular for a gas turbine.

This object is achieved by refinement of the aforementioned rotor, in which the, or each of the, attachment means extends through the rotor disk of at least one stage, whereby the, or each of the, attachment means is guided with radial play into at least one borehole passing through the respective rotor disk, so that an interior borehole surface is not subjected to load or force.

In the sense of the present invention, a rotor is thus proposed for a turbomachine whereby the attachment means for the removable attachment of two adjoining rotor disks or for the removable attachment of a rotor disk to a rotor shaft extends through a rotor disk. Consequently, in the sense of the present invention at least one borehole is provided in at least one rotor disk, the borehole passing through the rotor disk as such. This represents a departure from the principle, known from the prior art, that for reasons of strength boreholes for attachment means must not be provided in the rotor disk as such. In the sense of the present invention, the, or each of the, attachment means is guided with radial play into the boreholes passing through the rotor disk. Therefore, the interior borehole surface is not subjected to load or force. Instead, force is transmitted via a flange for the adjoining rotor disk or rotor connection, or via a flange for an intermediate stage seal. In this regard it is possible to transmit the load resulting from the screw connection into the rotor disk so as to distribute the load in a reproducible, defined, and uniform manner over the circumference of the rotor disk. The invention ultimately allows a compact and reliable rotor design. Furthermore, the design of the rotor according to the invention is economical and optimized with respect to weight.

According to one advantageous refinement of the invention, a flange or a flange section for an intermediate stage seal is positioned between the flange for the first rotor disk or rotor connection and the second rotor disk, so that the, or each of the, attachment means extends through the flange for the first rotor disk or rotor connection, through the flange for the intermediate stage seal, and through the second rotor disk. The, or each of the, attachment means is guided with radial play into the, or each of the, boreholes passing through the second rotor disk. In contrast, the, or each of the, attachment means is guided through without radial play into at least one borehole in the flange for the first rotor disk or rotor connection, and in at least one borehole in the flange for the intermediate stage seal.

Other objects, advantages and novel features of the present invention will become apparent from the following detailed description of the invention when considered in conjunction with the accompanying drawings.

BRIEF DESCRIPTION OF THE DRAWINGS

FIG. 1 shows a section through a rotor according to the invention for a high-speed, low-pressure turbine for an aircraft engine. Such a low-pressure turbine rotor is preferably formed from a plurality of rotor disks positioned one behind the other in the axial direction, i.e., in the direction of flow (arrow 11), and thus formed in stages, only one such rotor disk 10 being shown in FIG. 1.

Every two adjoining rotor disks in the low-pressure turbine rotor illustrated in sectional view in FIG. 1 are to be removably attached to one another via a screw connection. With reference to FIG. 1, this means that the rotor disk situated upstream from the rotor disk 10 shown, hereinafter referred to as the first rotor disk, is to be connected to the illustrated rotor disk 10, hereinafter referred to as the second rotor disk, via at least one attachment means. The first rotor disk positioned upstream from the second rotor disk 10 has a shell 12 that extends essentially in the axial direction. The shell 12 extends over the axial distance between the two rotor disks to be connected to one another, and a flange 13 is situated on one end of the shell 12. At least one borehole is provided in the flange 13 for the shell 12, and an attachment means 14 for connecting the two adjoining rotor disks extends through one of these boreholes, and, thus, through the flange 13. FIG. 1 shows only one such attachment means 14. However, a plurality of such attachment means 14 is positioned in a distributed manner over the circumference of the rotor, i.e., the rotor disks. To simplify illustration of the invention, reference will continue to be made below only to the one attachment means 14 illustrated in FIG. 1 and to the corresponding boreholes for this one attachment means 14. When multiple attachment means are distributed over the circumference, this is understood to apply as well to the boreholes for accommodating the attachment means.

Figure 1:
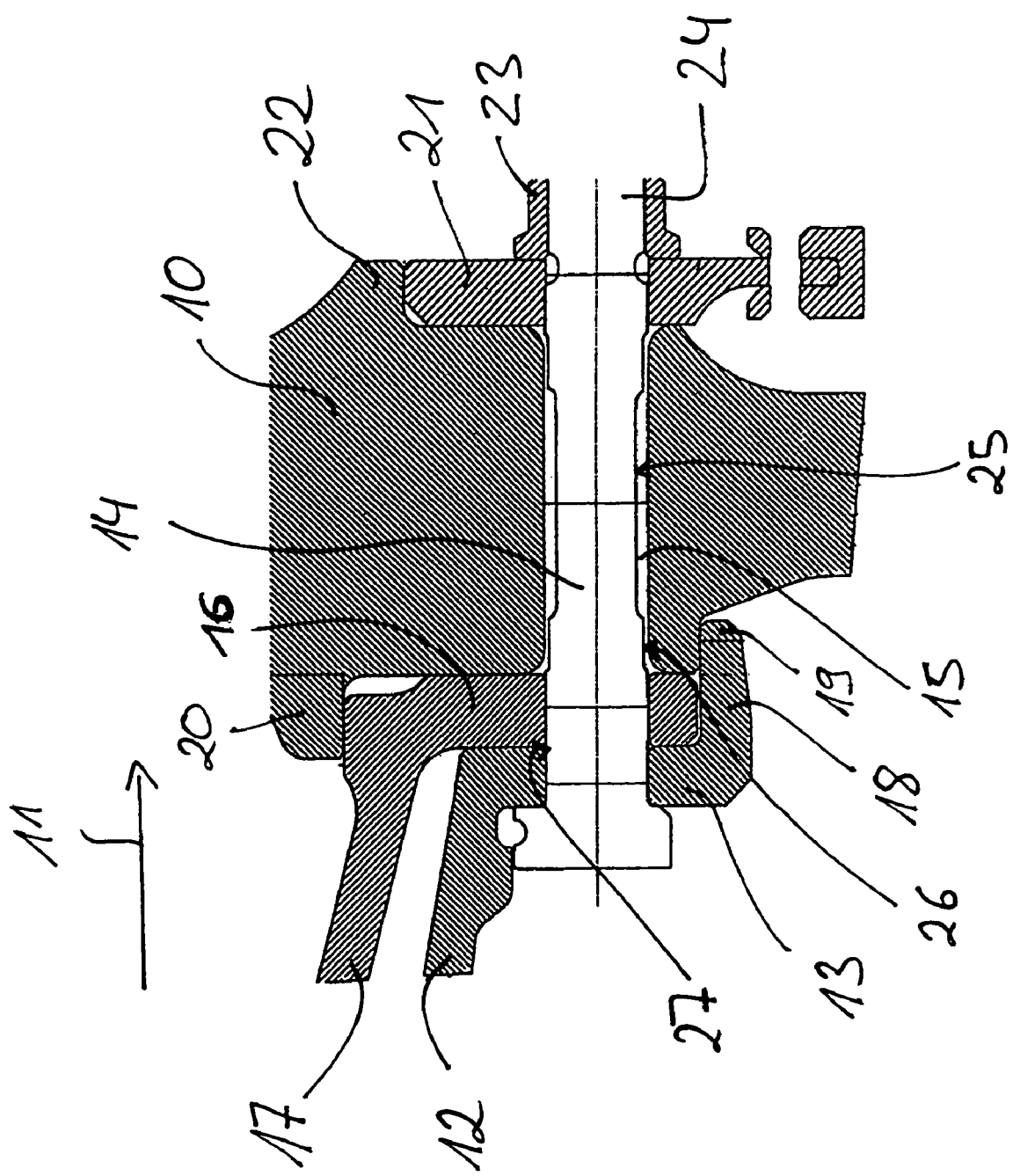
FIG. 1 shows a section from a rotor according to an embodiment of the invention for a turbomachine, in particular for a gas turbine.

In the sense of the present invention, at least one borehole 15 is likewise provided in one of the two rotor disks to be connected to one another, namely, in the second rotor disk 10, the borehole passing through the rotor disk 10 as such. The attachment means 14 thus extends through the flange 13 for the shell 12 of the first rotor disk and through the second rotor disk 10. As can be seen in FIG. 1, the attachment means 14 is guided with radial play into the borehole 15, which means that in the assembled state free space remains between an outer surface of the attachment means 14 and an inner surface of the borehole 15. The interior surface of the borehole 15 is therefore not subjected to load in the assembled state. In comparison, the attachment means 14 is guided with no radial play into the borehole for the flange 13.

In the preferred embodiment shown in FIG. 1, in the assembled state a flange 16 for an intermediate stage seal 17 is positioned between the flange 13 for the shell 12 of the first rotor disk and the second rotor disk 10. The attachment means 14 thus extends through the flange 13 for the shell 12 of the first rotor disk, through the flange 16 for the intermediate stage seal 17, and through the second rotor disk 10. The attachment means 14 is guided without radial play into a borehole in the flange 16 for the intermediate stage seal 17 or into the borehole in the flange 13. In contrast, the attachment means 14 is guided with radial play into the borehole 15 in the second rotor disk 10. The attachment means 14 is fixed in place in the borehole in the flange 13 for the first rotor disk or in the borehole in the flange 16 for the intermediate stage seal 17 by means of a bearing seat or sliding seat.

As can be seen in FIG. 1, the flange 13 for the shell 12 of the first rotor disk radially inwardly encloses the flange 16 in a section 18, with radial play. However, one end 19 of the section 18 encompasses a section of the second rotor disk 10 without play, so that contact is provided between the end 19 of the section 18 of the flange 13 and the rotor disk 10. A projection 20 of the rotor disk 10 radially outwardly encompasses the flange 16 for the intermediate stage seal 17 without play, so that there is contact between the projection 20 and the flange 16.

From the details described above, it follows that the, or each of the, attachment means 14 is guided with radial play into a respective borehole 15 in the second rotor disk 10. In the boreholes in the flange 13 or 16, however, the, or each of the, attachment means 14 is guided through without play in the radial direction. Thus, in the assembled state there is contact between the outer surface of the, or each of the, attachment means 14 and the inner surface of the boreholes in the flange 13 or 16, in the vicinity of the flange 13 for the shell 12 or the flange 16 for the intermediate stage seal 17. Section 18 of the flange 13 for the shell 12 radially inwardly encompasses the flange 16 for the intermediate stage seal 17 with radial play, whereas the rotor disk 10 is radially inwardly encompassed by the section 18 without play. The section 20 of the second rotor disk 10 radially outwardly encompasses the flange 16 for the intermediate stage seal 17 without play in the radial direction.

A closing ring 21 is used on the downstream side of the rotor disk 10 illustrated in FIG. 1. The, or each of the, attachment means 14 passes without radial play through the closing ring 21, namely, through a borehole in same. A projection 22 of the rotor disk 10 radially outwardly encompasses the closing ring 21 without radial play, so that there is contact between the projection 22 of the rotor disk 10 and the closing ring 21. FIG. 1 further shows a nut 23 which cooperates with a thread section 24 of the attachment means 14 and by means of which the screw connection according to FIG. 1 is ultimately fixed in place or secured.

Thus, in the sense of the present invention at least one rotor disk 10 of two adjoining rotor disks to be connected to another is penetrated by at least one borehole 15, an attachment means 14 being guided with radial play into each such borehole 15. The, or each of the, attachment means 14 is guided without radial play into at least one flange 13, 16 or into a closing ring 21 on both the downstream and upstream ends of the penetrated rotor disk 10. As a result, the, or each of the, boreholes 15 as such is not subjected to force or load. Screw loads, in particular screw edge loads, are transmitted into the rotor disk 10 on both sides of the, or each of the, boreholes 15 or of the rotor disk 10 via the flange 13 or 16 and via the closing ring 21 shown in FIG. 1. This results in a clearly defined transmission of force over the circumference of the penetrated rotor disk 10.

The, or each of the, attachment means 14 has a double-stepped cross sectional diameter or radius. A section 26 having a radius that is larger than the radius of a center section but smaller than that of a farther outwardly connecting section 27 connects to section 25. The radii of sections 25, 26, and 27 are dimensioned in such a way that in a malfunction in which load transmission by friction is not possible, the attachment means 14 comes to rest against the rotor disk in the circumferential direction so as to transmit the resulting stressful load in a reproducible, defined, and uniform manner over the circumference.

With reference to FIG. 1, the present invention has been described using one example in which two adjoining rotor disks of two adjacent stages are to be connected to one another. However, the invention is also applicable to single-stage rotors in which the single rotor disk is then to be joined to a rotor connection of a rotor shaft. In this case, for the flange 13 according to FIG. 1 this would involve the flange of a rotor connection.

In the sense of the present invention, it is possible that only every other rotor disk of rotor is penetrated in the sense of FIG. 1. In this case, the rotor disks positioned upstream and downstream from this rotor disk and to be connected to same would be attached via their flanges to both the upstream and downstream ends of the penetrated rotor disk. With reference to FIG. 1, this would mean that instead of the closing ring 21 illustrated in FIG. 1, a flange for a rotor disk positioned downstream from the rotor disk 10 would make contact. However, it is also possible for each rotor disk of a rotor to be designed in the sense of FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

10 rotor disk
11 arrow
12 shell
13 flange
14 attachment means
15 borehole
16 flange
17 intermediate stage seal
18 section
19 end
20 projection
21 closing ring
22 projection
23 nut
24 thread section
25 section
26 section
27 section

What is claimed is:

1. Rotor for a turbomachine, in particular a low-pressure turbine rotor for a gas turbine, having at least one stage, each stage comprising a rotor disk having rotor blades attached to the rotor disk, and the rotor disk of each stage being removably connected either to oppositely situated rotor disks of adjoining stages or to a rotor connection of a rotor shaft by at least one respective attachment,
   wherein at least one of the attachments extends through the rotor disk of at least one stage, whereby the at least one attachment is guided with radial play into at least one borehole passing through the rotor disk, so that an interior borehole surface is not subjected to load or force,
   wherein the at least one attachment extends through a flange for a first rotor disk of two oppositely situated rotor disks to be connected to one another, whereby the at least one attachment further extends through a second rotor disk of the two oppositely situated rotor disks to be connected to one another, and the at least one attachment is guided with radial play into at least one borehole passing through the second rotor disk, so that an interior borehole surface is not subjected to load or force, and
   wherein the at least one attachment is guided without radial play into each borehole in the flange for the first rotor disk or the rotor connection.

2. Rotor according to one or more of claim 1, wherein a flange or a flange section for an intermediate stage seal is positioned between the flange and the second rotor disk, so that the at least one attachment extends through the flange, through the flange for the intermediate stage seal, and through the second rotor disk.

3. Rotor according to claim 2, wherein the at least one attachment means is guided without play into each borehole in the flange for the intermediate stage seal.

4. Rotor according to claims 2, wherein at least one attachment is centered in the respective borehole in the flange and/or in the respective borehole in the flange for the intermediate stage seal by a bearing seat or sliding seat.

5. Rotor for a turbomachine, in particular a low-pressure turbine rotor for a gas turbine, having at least one stage, each stage comprising a rotor disk having rotor blades attached to the rotor disk, and the rotor disk of each stage being removably connected either to oppositely situated rotor disks of adjoining stages or to a rotor connection of a rotor shaft by at least one respective attachment,
   wherein at least one of the attachments extends through the rotor disk of at least one stage, whereby the at least one attachment is guided with radial play into at least one borehole passing through the rotor disk, so that an interior borehole surface is not subjected to load or force,
   wherein the at least one attachment extends through a flange for a rotor connection and through the rotor disk, whereby the at least one attachment is guided with radial play into at least one borehole passing through the rotor disk, so that an interior borehole surface is not subjected to load or force,
   wherein the at least one attachment is guided without radial play into each borehole in the flange for the first rotor disk or the rotor connection, and
   wherein a flange or a flange section for an intermediate stage seal is positioned between the flange and the second rotor disk, so that the at least one attachment extends through the flange, through the flange for the intermediate stage seal, and through the second rotor disk.

6. Rotor according to claim 5, wherein the at least one attachment is guided without play into each borehole in the flange for the intermediate stage seal.

7. Rotor according to claims 5, wherein at least one attachment is centered in the respective borehole in the flange and/or in the respective borehole in the flange for the intermediate stage seal by means of a bearing seat or sliding seat.

8. Rotor for a turbomachine, in particular a low-pressure turbine rotor for a gas turbine, having at least one stage, each stage comprising a rotor disk having rotor blades attached to the rotor disk, and the rotor disk of each stage being removably connected either to oppositely situated rotor disks of adjoining stages or to a rotor connection of a rotor shaft by at least one respective attachment,
   wherein at least one of the attachments extends through the rotor disk of at least one stage, whereby the at least one attachment is guided with radial play into at least one borehole passing through the rotor disk, so that an interior borehole surface is not subjected to load or force,
   wherein every other rotor disk has a cylindrical or conical shell extending in the axial direction, preferably on both sides, a flange being provided on one end of each shell, and that between two such rotor disks a rotor disk is positioned which is penetrated.

* * * * *